United States Patent [19]

Pham et al.

[11] Patent Number: 5,538,704
[45] Date of Patent: Jul. 23, 1996

[54] REDUCTION OF AMMONIA SLIP IN NITROGEN OXIDES REDUCTION PROCESS

[75] Inventors: Hoanh N. Pham; Todd A. Shirley, both of Allentown, Pa.

[73] Assignee: Air Products and Chemicals, Inc., Allentown, Pa.

[21] Appl. No.: 371,321

[22] Filed: Jan. 11, 1995

Related U.S. Application Data

[63] Continuation of Ser. No. 67,752, May 26, 1993, abandoned.

[51] Int. Cl.$^6$ ................................................ B01D 53/56
[52] U.S. Cl. .............................................. 423/235; 95/271
[58] Field of Search ............................. 423/239.1, 235; 95/271; 55/237, 238

[56] References Cited

U.S. PATENT DOCUMENTS

| | | | |
|---|---|---|---|
| 4,756,890 | 7/1988 | Tang et al. | 423/235 |
| 4,770,863 | 9/1988 | Epperly et al. | 423/235 |
| 4,843,981 | 7/1989 | Goldbach, et al. | 110/347 |
| 5,190,451 | 3/1993 | Goldbach et al. | 110/245 |
| 5,236,354 | 8/1993 | Goldbach et al. | 110/212 |
| 5,462,718 | 10/1995 | Abdulally | 422/171 |

FOREIGN PATENT DOCUMENTS 0176293  9/1985  European Pat. Off. .

OTHER PUBLICATIONS

Leckner, Bo, et al. "Influence of Additives on Selective Noncatalytic Reduction of NO with NH3 in Circulating Fluidized Bed Boilers", Industrial and Engineering Chemistry Research, 1991, vol. 30, pp. 2396–2404.

*Primary Examiner*—Steven Bos
*Assistant Examiner*—Peter T. DiMauro
*Attorney, Agent, or Firm*—Robert J. Wolff

[57] ABSTRACT

The present invention is an ammonia injection scheme for $NO_x$ reductions that also reduces ammonia slip wherein the $NO_x$ containing gas to be treated is upstream of a cyclone separator. The reduction in ammonia slip is accomplished by injecting the ammonia through the outside wall of the cyclone inlet duct.

3 Claims, 1 Drawing Sheet

REDUCTION OF AMMONIA SLIP IN NITROGEN OXIDES REDUCTION PROCESS

This is a continuation of application Ser. No. 08/067,752 filed May 26, 1993, now abandoned.

TECHNICAL FIELD

The present invention relates to a process for reducing the concentration of nitrogen oxides ($NO_x$) in a $NO_x$ containing flue gas.

BACKGROUND OF THE INVENTION

Processes for reducing the concentration of $NO_x$ (a common industrial pollutant) in a $NO_x$ containing gas are well known in the art. These processes generally comprise:

(a) withdrawing the $NO_x$ containing flue gas as portion of the combustion effluent from the combustion of a carbonaceous fuel (fluidized-bed boilers are among the most efficient devices for burning carbonaceous fuels; the $NO_x$ is primarily formed from the oxidation of fuel-bound nitrogen);

(b) injecting ammonia into the $NO_x$ containing flue gas in order to reduce the concentration of $NO_x$ in the flue gas (the reduction of $NO_x$ by ammonia is feasible within a narrow temperature range of approximately 1600° F.–2000° F. with an optimum temperature of about 1785° F.; at higher temperatures, the ammonia is converted to $NO_x$ while at lower temperatures, reduction of $NO_x$ by ammonia is less effective); and (c) feeding the ammonia treated flue gas to a cyclone in order to separate entrained particulate matter from the ammonia treated flue gas.

See for example U.S. Pat. No. 4,756,890 by Tang et al. and European published patent application No. 176,293 by Cooper et al. U.S. Pat. No. 4,770,863 by Epperly et al. teaches that further reductions of $NO_x$ can be obtained by also injecting various enhancers into the flue gas such as ethylene glycol or sugar. Epperly further teaches that the use of his enhancer also reduces the concentration of unreacted ammonia in his ammonia/enhancer treated gas. Such a reduction in the "ammonia slip" (as it is often referred to in the art) is very advantageous since ammonia is a pollutant in and of itself. There is a need in the industry, however, to reduce the ammonia slip in a $NO_x$ reducing ammonia injection scheme without resorting to the use of an enhancer. It is an object of the present invention to meet this need.

SUMMARY OF THE INVENTION

The present invention is an ammonia injection scheme for $NO_x$ reductions that also reduces ammonia slip wherein the $NO_x$ containing gas to be treated is upstream of a cyclone separator. The reduction in ammonia slip is accomplished by injecting the ammonia through the outside wall of the cyclone inlet duct.

DETAILED DESCRIPTION OF THE INVENTION

Figure 1:
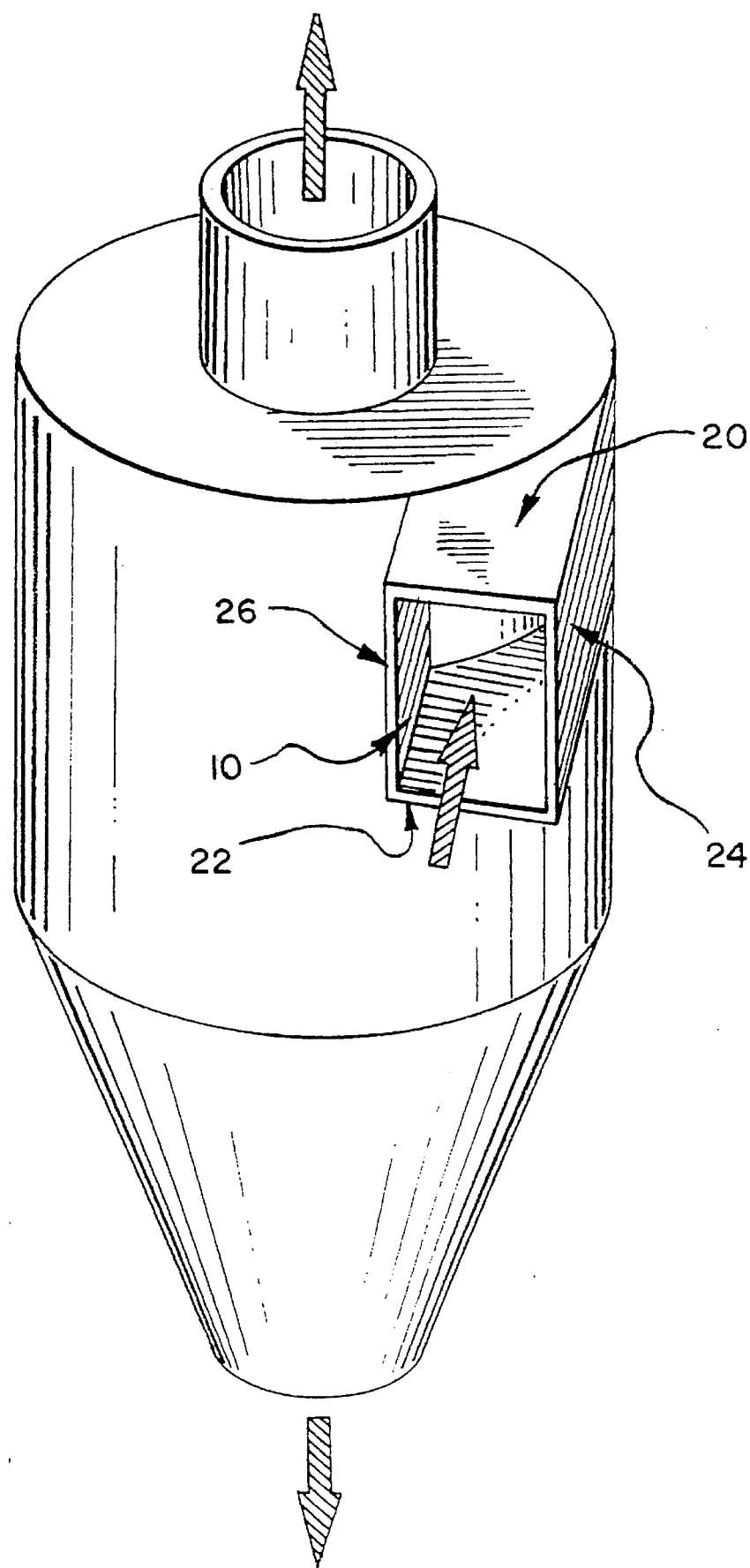
FIG. 1 is a drawing of a standard cyclone which is useful in describing the process of the present invention.

The present invention is an improved process for reducing the concentration of $NO_x$ in a $NO_x$ containing flue gas. In the process to which the improvement of the present invention pertains:

(a) the $NO_x$ containing flue gas is withdrawn as a portion of the combustion effluent from the combustion of a carbonaceous fuel;

(b) ammonia is injected into the $NO_x$ containing flue gas in order to reduce the concentration of $NO_x$ in the flue gas; and (c) the ammonia treated flue gas is fed to a cyclone in order to separate entrained particulate matter from the ammonia treated flue gas.

To describe the improvement of the present invention, it is helpful to refer to FIG. 1's drawing of a standard cyclone. As shown in FIG. 1, the standard cyclone includes an inlet duct 10 for introducing the feed in, to the cyclone in a direction which is substantially tangential to the circular flow within the cyclone. The entrained particulate matter is removed from the bottom of the cyclone while the particulate free gas is removed from the top of the cyclone. The inlet duct consists of four perimeter walls which form a rectangular cross sectional area: a top wall 20, a bottom wall 22 opposite the top wall, an outside wall 24 and an inside wall 26 opposite the outside wall. The outside wall is more specifically defined herein as that perimeter wall of the inlet duct which is most nearly at a tangential angle to the circular flow within the cyclone.

The improvement of the present invention is for reducing the concentration of ammonia in the ammonia treated gas (ie reducing the ammonia slip) and comprises injecting the ammonia through the outside wall of the cyclone inlet duct. Although not shown in FIG. 1, the ammonia can be injected through a nozzle configuration on the outside wall comprising one or more nozzles.

The term ammonia as employed in this description includes the compound ammonia itself, and/or ammonia containing compounds (such as ammonia carbonate which will yield ammonia upon vaporization), in aqueous solutions or otherwise.

The reason for the present invention's reduction in ammonia slip is probably a function of the fact that injecting the ammonia through the outside wall of the cyclone inlet duct makes the entry of the ammonia into the cyclone far away from the vortex finder which is located in the center of the cyclone. This in turn increases the residence time of the ammonia in the cyclone which in turn gives the ammonia more time to form ammonia radicals before exiting the cyclone via the vortex finder. (In what is not fully understood, the ammonia radicals subsequently react with the $NO_x$ to form nitrogen and water or subsequently decompose into different species.)

It should be noted that to the extent that the key to the present invention is allowing the ammonia to enter the cyclone far away from the vortex finder, the present invention can be broadened to other areas of the inlet duct's perimeter which are near the outside wall. (For example, the ammonia could also be injected through those portions of the top and bottom walls that are closest to the outside wall.) It should also be noted that the present invention can be extended to cyclone inlet ducts having cross sectional shapes areas other than the usual rectangular shape such as a duct having a circular cross section. In such a case, the ammonia would be injected through that portion of the cyclone inlet duct's perimeter which corresponds to the outside wall of a rectangular inlet duct.

It should be further be noted that, as taught in copending U.S. patent application Ser. No. 07/068,725, a tradeoff of the present invention is a reduction in ammonia utilization. In actual operation, this tradeoff is optimized depending on the importance one assigns to ammonia utilization vis-a-vis ammonia slip.

The following example is offered to demonstrate the efficacy of the present invention.

EXAMPLE

This example is the result of experimentation conducted at a commercial coal fired cogeneration facility in Stockton, Calif. The purpose of this example is to demonstrate the present invention's reduction in ammonia slip. This was accomplished by showing that, in reducing a flue gas $NO_x$ concentration from approximately 190 parts per million (ppm) to approximately 21 ppm, the amount of ammonia slip is reduced as a higher percentage of the ammonia is injected through the outside wall via-a-vis the inside wall of the cyclone inlet duct. As can be seen in the following Table, as the percentage of the ammonia injected through the outside wall vis-a-vis the inside wall is increased from 0% to 100%, the relative amount of ammonia slip is reduced by 78%. When 100% of $NH_3$ is injected through outside wall vis-a-vis inside wall, as shown in Table I, ammonia is not injected through inside wall.

TABLE I

| % of $NH_3$ Injected Through Outside Wall vis-a-vis Inside Wall | Relative Amount of $NH_3$ Slip in Achieving a 169 PPM $NO_x$ Reduction |
|---|---|
| 0 | 1.00 |
| 17 | 0.91 |
| 66 | 0.47 |
| 100 | 0.22 |

We claim:

1. In a process for reducing the concentration of $NO_x$ in a $NO_x$ containing flue gas comprising:

(a) withdrawing the $NO_x$ containing flue gas as a portion of the combustion effluent from the combustion of a carbonaceous fuel;

(b) injecting ammonia into the $NO_x$ containing flue gas in order to reduce the concentration of $NO_x$ in the flue gas; and (c) feeding the ammonia treated flue gas to a cyclone in order to separate entrained particulate matter from the ammonia treated flue gas wherein:

(i) said cyclone includes an inlet duct for introducing the feed into the cyclone in a direction which is substantially tangential to the circular flow within the cyclone;

(ii) said inlet duct consists of four perimeter walls which substantially form a rectangular cross sectional area;

(iii) said four perimeter walls consist of a top wall, a bottom wall opposite the top wall, an outside wall and an inside wall opposite the outside wall;

(iv) said outside wall is that perimeter wall of the inlet duct which is most nearly at a tangential angle to the circular flow within the cyclone;

the improvement for reducing the concentration of ammonia in the ammonia treated gas consisting of cyclone duct ammonia injection by injecting the ammonia through the outside wall of the cyclone inlet duct, and not the inside wall of the cyclone inlet duct, in order to allow the ammonia to flow along the outside wall of the cyclone inlet duct.

2. The process of claim 1 wherein the ammonia is injected through a nozzle configuration on the outside wall comprising one or more nozzles.

3. The process of claim 1 wherein said combustion of the carbonaceous fuel occurs in a fluidized-bed boiler.

* * * * *